United States Patent [19]

Fencsik et al.

[11] Patent Number: 4,511,968
[45] Date of Patent: Apr. 16, 1985

[54] COMMUNICATION CHANNEL INTERFACE UNIT

[75] Inventors: Gabor Fencsik, Berkley; Fletcher M. Glenn, II, Danville, both of Calif.

[73] Assignee: MDS-Qantel, Inc., Hayward, Calif.

[21] Appl. No.: 478,921

[22] Filed: Mar. 24, 1983

[51] Int. Cl.³ .............................................. G06F 3/00
[52] U.S. Cl. ................................................... 364/200
[58] Field of Search ...................... 364/200 MS File; 340/825.5

[56] References Cited

U.S. PATENT DOCUMENTS 4,454,581 6/1984 Nystrom .............................. 364/200
4,458,314 7/1984 Grimes ................................ 364/200
4,466,058 8/1984 Girard et al. ....................... 364/200
4,470,112 9/1984 Dimmick ............................ 364/200

Primary Examiner—Raulfe B. Zache
Attorney, Agent, or Firm—Robert R. Hubbard

[57] ABSTRACT

Interface unit for handling translation of message signals between a communication channel and a communications processor. The processor and interface unit are embodied in a data processing station of which a plurality of such stations are arranged along the communication channel. The interface unit includes a microstate machine which under program control directs the operations of message transmission, message receipt, and communication channel contention.

4 Claims, 4 Drawing Figures

COMMUNICATION CHANNEL INTERFACE UNIT

BACKGROUND OF THE INVENTION

This invention is directed to a novel and improved interface unit which is operable to handle the exchange of signals between an associated communication processor and a communication channel.

The communication channel interface unit of invention is useful in a distributed processing system consisting of a number of processor stations. A user at one station can access data and or run programs resident at another processor station. That the data and or programs are resident at another processor station is for all practical purposes invisible or transparent to the user. In such a system each processor station includes a communication controller which serves the purpose of controlling the exchange of messages between its associated processor and the other processing stations. The communications controller itself includes a communication processor for handling message exchanges. The communication channel interface unit of this invention provide a signal interface between its associated communication processor and the communication channel. In particular, the communication channel interface unit of this invention can be employed in the communication controller described in a copending application, Ser. No. 478,604, filed 3/24/83, in the names of Gerhard Ringel and Gabor Fencsik and entitled "Communication Controller with Slot Reservation".

Interface units which provide signal translation between a communication channel and a communications processor generally comprise one mechanism for message signal transceiver operations and a separate and independent mechanism for channel contention operations.

SUMMARY OF INVENTION

An object of this invention is to provide a novel and improved channel interface unit in which common mechanisms are shared by transceiver operations and channel contention operations.

Channel interface units embodying this invention employ a microstate machine such as the one described in Application Ser. No. 340,312, filed Jan. 18, 1982, for Method and Apparatus for Recovering NRZ Information from MFM Data in the names of Fletcher M. Glenn, II and James A. Fosse. The microstate machine is programmed to handle the transceiver operations and the channel contention operation. A channel contention circuit is also provided to assert contention for use of the channel and to provide a set of channel contention status signals. The microstate machine under the control of the channel contention program interacts with a request to send (RTS) signal and with the channel contention status signals to enable the contention circuit to assert contention of the channel and to provide a clear to send (CTS) signal to the processor if the contention is successful.

A transition detector circuit is also provided for generating a data signal as a function of and in response to the presence of signal transitions on the channel. The transceiver program causes the microstate machine to operate on this signal in a manner similar to that described in the aforementioned copending application of Fletcher M. Glenn, II and James A. Fosse.

BRIEF DESCRIPTION OF THE DRAWING

The above and other features and advantages of the present invention will become more apparent from the following description taken in conjunction with the accompanying drawing, in which.

DESCRIPTION OF PREFERRED EMBODIMENT

Although the channel interface unit of this invention can be applied in a variety of communication applications, by way of example in completeness of description, the inventive features will be described herein in a communication channel interface unit for a distributed processing system.

Figure 1:
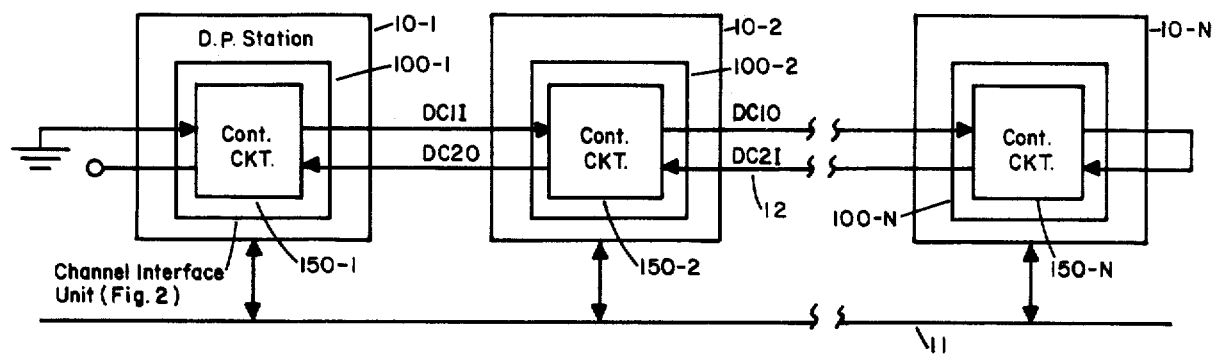
FIG. 1 is a block diagram of a distributed processing system in which the communication channel interface unit of this invention may be employed.

A typical distributor processing system is shown in FIG. 1 to include a number of data processing work stations 10-1, 10-2, . . . 10-N which are interconnected with one another for communication purposes by a communication channel 11. Each data processing station includes a main processing unit and a communication controller, neither of which is specifically shown in FIG. 1 but are described and illustrated in some detail in the aforementioned copending application of Gerhard Ringel and Gabor Fencsik. Suffice is to say here that each such communication controller includes a communication processing unit which under program control directs the interpretation and exchange of message traffic between the main processing unit of its associated station and any of the other data processing stations. The channel interface unit of this invention serves as part of an input/output device to such communication processing unit and may be employed in such a communication controller.

The communication controllers of the data processing stations 10-1, 10-2 . . . 10-N include channel interface units 100-1, 100-2 . . . 100-N, respectively. The channel interface units 100-1, 100-2 . . . 100-N include, inter alia, channel contention circuits 150-1, 150-2 . . . 150-N, respectively.

The channel contention circuits of each station are interconnected by means of a separate channel contention cable 12 which is arranged to pass through each contention circuit twice, once in a left to right direction and once again in a right to left direction as illustrated in FIG. 1. As shown contention circuit 150-2, contention cable 12 is applied as inputs DC1 I and DC2 I and is taken as output DC1 O and DC2 O. At the right most extremity, cable 12 is looped so that for contention circuit 150-N DC1 O and DC2 I are essentially electrically identical. At the left extremity, one terminal of cable 12 is grounded and the other is left open.

Before describing the rules of contention, the channel interface unit will be described. Since the channel interface units of the various data processing stations are substantially similar, only channel interface unit 100-2 will be described in any detail.

The channel interface unit is connected to receive from its associated controller a request to send (RTS) signal and a transmit data signal (TXD). To this end, SIO 15 of the associated communication controller has its RTS and TXD outputs connected as inputs to a multiplexer (MUX) 101-1. The SIO 15 also receives as inputs from the channel interface unit the following signals:

| | |
|---|---|
| Carrier Detect | (DCD), |
| Clear to Send | (CTS), |
| Receive Clock | (RXC) and |
| Receive Data | (RXD) |

The SIO also has other connections to the communication processor such as those illustrated in the aforementioned copending application of Gerhard Ringel and Gabor Fencsik.

The MUX 101-1 also receives as an input a transition data (TDATA) signal from a transition detector 110-1. The transition detector is also interconnected with communication channel 11. The transition detector 110-1 serves to detect the presence of signal transitions on communication channel 11 and to generate the TDATA signal as a function of such transitions. For example, the transition detector 110-1 simply generates a pulse stream with each pulse representing a signal transition on channel 11.

The MUX 101-1 has a pair of further inputs, one of which is connected to circuit ground and the other of which is connected to a source of high level signal, as for example, a VCC source of voltage.

The MUX 101-1 also receives as an input a set of contention status signals. These signals are generated by the contention circuit 150-2 and include the signals clear to request (CTRQ), contention interval timer (TIMER) and the contention cable input DC2 I. The contention circuit and the rules of contention will be described later in connection with FIGS. 1 and 3.

The MUX 101-1 serves as an input element to a microstate machine which further includes address counter 102-1, address read only memory (ROM 103-1) program ROM 104-1, latch 105-1, gates 106-1, 107-1 and 108-1 and line driver 109-1. This microstate machine is similar to the one described in detail in the aforementioned copending application of Fletcher M. Glenn, II and James A. Fosse. Notable differences are the input signals RTS, TXD and contention status, and the additional output signals line request (LNRQ), MUX select (MUXSEL), CTS and DCD and aforementioned gates and line driver.

The MUXSEL signal differs from the multiplexer select signals in the aforementioned Glenn and Fosse application only in that it consists of three signal leads rather than two. This is to accomodate the selection of many more input to the MUX 101-1. This is signified by the splash and the numeral three adjacent the MUXSEL connection from latch 105-1 to MUX 101-1. The LNRQ signal serves as an enable signal to the contention circuit 150-2 for the start of contention for channel 11. The DCD signal signifies the presence of a carrier or signal on channel 11. The CTS signal signifies that the channel is free for the associated station to transmit (channel is seized).

The additional inputs to the MUX 101-1 are provided together with appropriate programming to give the microstate machine the additional ability to control the associated station's contention for use of channel and to translate transmission data from the SIO 15 to channel 11 when control has been so seized. As in the copending Glenn and Fosse application, the microstate machine operates on the received data signal, TDATA, in conjunction with the VCC and ground inputs to MUX 101-1 to produce the received clock and received data signals RXC and RXD.

The microstate machine operation is described in detail in the copending Glenn and Fosse application. Suffice is to say here that counter 102-1 responds to a high speed clock signal to address both the address ROM 103-1 and the program ROM 104-1. The high speed clock is represented symbolically by the symbol O as an input both to the counter 102-1 and the latch 105-1. Stored in the program ROM are program sequences of bit patterns which produce the output signals appearing at the output of the latch 105-1. The counter state and/or output value is controlled by the output of MUX 101-1 which, when asserted, causes the value stored in the program ROM 103-1 to be loaded into counter 102-1 as a starting address. That is, the values stored in the program ROM are address pointers which are used for branches in the program sequences stored in the program ROM.

The MUX 101-1 acts under the control of the MUXSEL signals to select one of the MUX inputs for application to the address counter. The MUXSEL inputs are essentially three bits of the bit pattern which is currently addressed in the program ROM.

The data signal can either be data for transmission over channel 11 or data which has been received from channel 11. If the former, the data signal is combined in AND gate 106-1 with the CTS signal and passed by way of a line driver 109-1 to the channel 11. The CTS signal for this situation will be asserted.

On the other hand, when the data signal is received data it is combined in an AND gate 108-1 with the complement of CTS to produce the RXD signal. The complement of the CTS signal is derived by means of an inverter 107-1.

By appropriate choice of the mapping organization of the address ROM and the program ROM, the carrier detect (DCD) signal can be the most significant bit of the address counter output. That is, this bit will always be asserted when the program ROM is executing the program routine concerned with the reception of an inbound message over channel 11.

According to the rules of contention, no station can initiate contention if either of its inputs DC1 I or DC2 I (FIG. 1) are high. This signifies that the channel is already in use or that another station has already initiated contention. When both inputs are low, the channel is inactive and a station may initiate contention. A station initiates contention by setting its output DC1 O high and starting a contention interval timer. This interval is selected to allow the high signal to propagate the entire length of cable 12. If at the end of the interval its input DC2 I is high, it has won contention and use of the communication channel 11.

Once contention has been won and control of the channel 11 has been seized, a station must maintain control of the channel by keeping its outputs DC1 O high and DC2 O low until it is ready to relinquish control of the channel.

During the contention interval, a station which does not have control of the channel or which is not contending for control of the channel must propagate any high signal which it receives along the loop to its neighboring station. However, two or more stations may initiate contention at about the same time provided none of the inputs to these stations is high. What happens is that the station furthest to the right will win contention because it will block the propagation of the high signal to the DC2 I input of the stations to its left.

Figure 3:
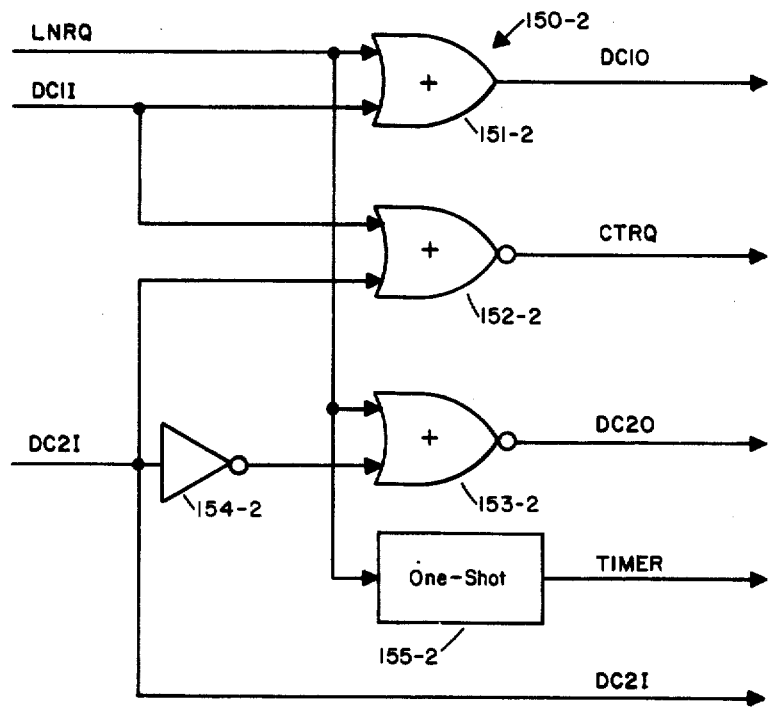
FIG. 3 is a block diagram of a contention circuit which may be employed in the channel interface unit of this invention.

Referring now to FIG. 3, the enable signal LNRQ, when asserted, initiates contention. To this end, the signal LNRQ is applied as an input to OR gate 151-2, to NOR gate 153-1 and to one shot timer 155-2. This causes output DC1 O of gate 151-2 to go high, output DC2 O of gate 153-2 to go low and the TIMER signal output of one shot 155-2 to start the contention time interval.

The other input to OR gate 151-2 is DC1 I. This implements the rule that a contention circuit must propagate a high signal from one of its left hand neighbors to its right hand neighbors. The other input to NOR gate 153-2 is the DC2 I input which first passes through an inverter 154-2. This implements the rule that a contention circuit must propagate a high signal from one of its right hand neighbors to its left hand neighbors but only in the event that the contention circuit is not already contending for use of the line or its associated station has control of the channel.

NOR gate 152-2 is arranged to monitor the signals DC1 I and DC2 I so as to assert its output clear to request (CTRQ) only when both DC1 I and DC2 I are low. The signals CTRQ, Timer and DC2 I constitute the contention status signals which are applied as an input to the MUX 101-1 in FIG. 2.

Figure 4:
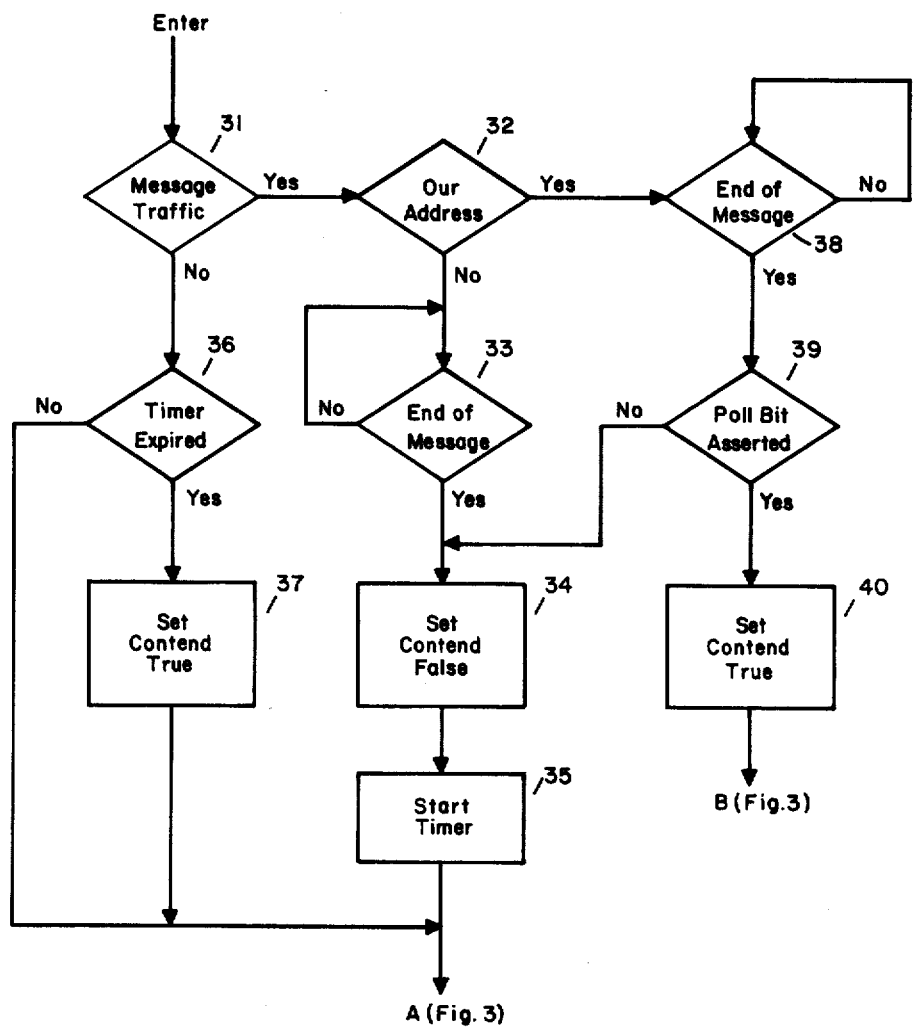
FIG. 4 is a flow diagram of the program routines which operate the channel interface unit to achieve channel contention and transceiver operations.

Turning now to FIG. 4, the program which handles the transmit receive and contention operations will be described. The program starts at block 20 where it is determined whether any signal transitions are present on the communication channel 11. If there are, the operation proceeds to block 21 which constitutes a routine for processing the received data. This routine is quite similar to the routine described in the copending Glenn and Fosse application. Accordingly, it need not be described here. It should be noted, however, that the received data could be encoded in other than the modified frequency modulation disclosed in the Glenn and Fosse application. In such case, the receive routine would have to be modified accordingly. When all of the received data has been processed, the program returns to the starting point at block 20.

If there are no signal transitions present on the communication channel 20, the program proceeds to the contention routine 30 which handles various operations concerned with the contention procedure. In particular, the operation proceeds to block 22 where it is determined if the RTS signal is asserted. If not, the program proceeds to block 23. At block 23 the microstate machine is operable to clear the line request LNRQ signal. When this has happened, the program returns to the starting point at block 20.

If the RTS signal is asserted signifying the need to transmit a message, the program proceeds to block 24. At block 24 the microstate machine must determine if the CTRQ status signal is true. That is, the microstate machine will sample the CTRQ contention status signal at this time. If the CTRQ signal is false, the program returns to the starting point at block 20. On the other hand, if the CTRQ signal is true, this signifies that it is okay for the associated station to try for contention of the channel 11. The program then proceeds to block 25 where it asserts the LNRQ signal. The assertion of the LNRQ signal starts the contention interval timer in the contention circuit as described above in connection with FIG. 3. The program then proceeds to block 26 to determine whether the contention interval timer has expired. That is, the microstate machine at this time samples the status of the timer signal (see FIGS. 2 and 3). If the timer has not expired, the program is operable to continue to sample the TIMER signal until the interval has expired. This is illustrated in FIG. 3 by the connection from the NO output of block 26 back to the input.

Figure 2:
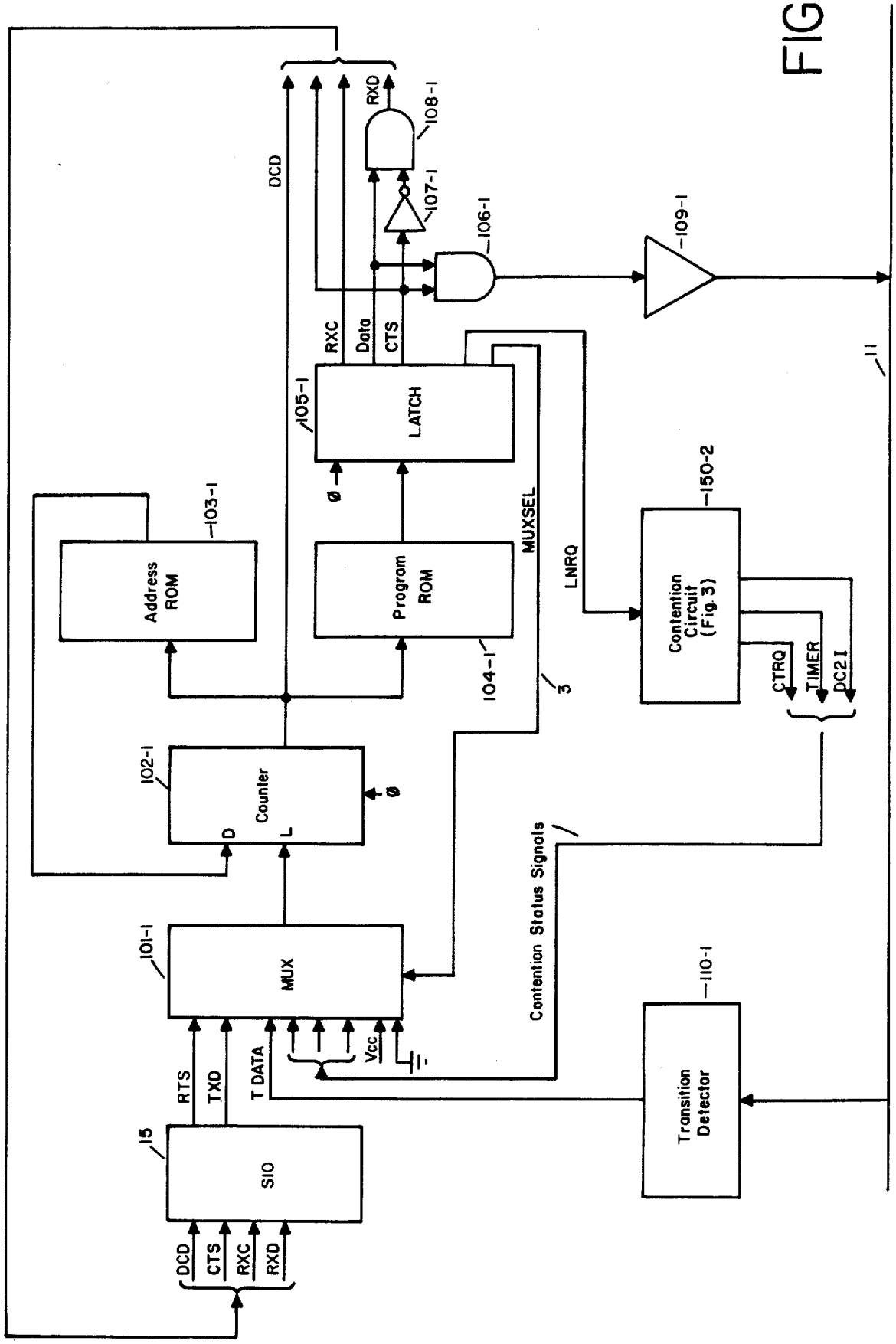
FIG. 2 is a block diagram of a communication channel interface unit embodying the invention.

When the contention timer interval has expired, the program proceeds to block 27 to determine whether the DC2 I signal is asserted. If not, the program returns to the starting point at block 20. On the other hand, if the DC2 I signal is asserted, this signifies that contention has been won and that the channel 11 may be seized. The program then proceeds to block 28 where it asserts the clear to send (CTS) signal to the SIO 15 (FIG. 2).

The program then exits the contention routine 30 to proceed to block 29. At block 29 the program enters a transmit routine to pass on the TXD signal from the SIO to the output latch 105-1 as a data signal. At this time the CTS signal will be asserted so that the data is coupled by way of gate 106-1 and line driver 109-1 to communication channel 11 (see FIG. 2). At the end of the transmit routine, the program will clear the LNRQ signal i.e., remove its asserted state. This will free up the channel 11 for contention equally by all stations including the associated station. The program then proceeds back to the starting point at block 20.

Thus, while preferred embodiments of the invention are shown in the drawings, it is to be understood that this disclosure is for the purposes of illustration only and that various changes in the hardware and software as well as the substitution of equivalent elements for those herein shown and described may be made without departing from the sphere or the scope of this invention as set forth in the appending claims.

What is claimed is:

1. In a system having a plurality of data processing stations in which messages are exchanged among the stations over a communication channel and in which each station includes a processor to handle such message exchanges by asserting a request to send signal when it is desired to transmit a message and to provide such message for transmission upon the assertion of a clear to send signal, an improved channel interface unit for operating upon the request to send signal, posting the assertion of the clear to request signal and translating such message to the channel comprising:

a channel contention circuit for asserting contention for use of the channel and for providing a set of contention status signals; and a microstate machine arranged under program control to interact with the request to send signal and the channel contention status signals to enable the contention circuit to assert contention, to post such clear to send signal and to translate such message to the channel.

2. The improved communication channel interface unit set forth in claim 1 which further comprises:

a signal transition detector responsive to signal transitions on the channel to generate a signal stream as a function of such transitions; and the microstate machine responding to said signal stream to enter a receive mode and translate the signal stream to the processor.

3. The improved communication channel interface unit set forth in claim 2 in which the microstate machine is primarily operative to sample for the signal stream and in its absence to sample for assertion of the request to send signal and upon such assertion of the request to send signal to enable the contention circuit to assert for contention of the use of the channel.

4. The improved communication channel interface unit set forth in claim 3 in which the contention circuit asserts one of the contention status signals for the duration of a contention interval; and the microstate machine asserting the clear to send signal only after the contention interval has expired.

* * * * *